United States Patent [19]

Sielfeld et al.

[11] 4,438,244

[45] * Mar. 20, 1984

[54] PROCESS FOR THE PRODUCTION OF POLYMERS AND COPOLYMERS OF VINYL CHLORIDE

[75] Inventors: Gilbert Sielfeld; Paul Sunder-Plassmann, both of Marl, Fed. Rep. of Germany

[73] Assignee: Chemische Werke Huels, AG, Marl, Fed. Rep. of Germany

[*] Notice: The portion of the term of this patent subsequent to Sep. 11, 2000 has been disclaimed.

[21] Appl. No.: 381,608

[22] Filed: May 24, 1982

[30] Foreign Application Priority Data

May 22, 1981 [DE] Fed. Rep. of Germany ....... 3120358

[51] Int. Cl.$^3$ .......................... C08F 2/20; C08F 14/06
[52] U.S. Cl. ................................. 526/202; 526/220; 526/344.2
[58] Field of Search .......................... 526/89, 220, 202

[56] References Cited

U.S. PATENT DOCUMENTS 3,817,963  6/1974  Balwe .................................. 526/200
4,368,307  1/1983  Sielfeld ............................... 526/202

Primary Examiner—C. A. Henderson
Attorney, Agent, or Firm—Millen & White

[57] ABSTRACT

Vinyl chloride is polymerized in suspension using as the suspension stabilizer a copolymer of 65–85 molar percent of 2-isopropyl-$\Delta^2$-oxazoline and 35–15 molar percent of 2-methyl-$\Delta^2$-oxazoline, having a viscosity number of 35–80 ml/g, measured at 25° C. in an isopropanol/water mixture (50 volume percent of isopropanol) in a concentration of 0.5% (weight/volume of solution).

11 Claims, No Drawings

PROCESS FOR THE PRODUCTION OF POLYMERS AND COPOLYMERS OF VINYL CHLORIDE

CROSS REFERENCE TO RELATED APPLICATIONS

This application is related to commonly assigned U.S. application Ser. No. 301,270, filed on Sept. 11, 1981, now U.S. Pat. No. 4,368,307, whose disclosure is incorporated by reference herein.

BACKGROUND OF THE INVENTION

In the production of polyvinyl chloride resins by suspension polymerization, the monomer or monomer mixture is finely distributed in the aqueous phase by mechanical agitation, stabilized by addition of protective colloids or suspension stabilizers, and polymerized in the presence of free radical catalysts.

Suitable suspension stabilizers include water-soluble, natural polymeric materials, such as gelatin, starch, and the like; water-soluble cellulose derivatives, such as alkyl celluloses, hydroxyalkylcelluloses, and the like; water-soluble, synthetic products, such as partially saponified polyvinyl acetates, copolymers of maleic anhydride and vinyl acetate, and also various combinations of the aforementioned materials.

Polyvinyl chloride resins produced using the aforementioned suspension stabilizers yield, in soft processing, finished components having a large number of so-called gels or fisheyes. This is due to their unsatisfactory absorption of plasticizer. Furthermore, residual monomer can be removed only with great expense and difficulty due to their low granular porosity and compact granular structure. In order to overcome these drawbacks, it has been suggested (DOS Nos. 2,528,950 and 2,629,880) to use partially saponified polyvinyl acetates having degrees of hydrolysis of 20-65 mole % and degrees of polymerization (number average) of 200-3,000 as cosuspension stabilizers in combination with, preferably, cellulose derivatives and partially saponified polyvinyl acetates having degrees of hydrolysis of more than 65 mole %, in order to improve plasticizer absorption, granular porosity and reduce gel content.

Although porosity-enhancing agents improve the properties of the resins for soft processing, these resins still exhibit an unsatisfactorily high gel content due to the deficient properties of the primary suspension stabilizers. This is especially true if the polyvinyl chloride resin combined with plasticizers is processed at high processing speeds. In addition, such products still have too low a porosity for ready performance of vinyl chloride degasification for maximum removal of unreacted monomer.

In polyvinyl chloride resins manufactured by conventional methods using the usual suspension stabilizers, an interaction exists between porosity and bulk density. An increase in porosity, for the purpose of satisfactory monomer removal, causes a great reduction in bulk density. A reduction in bulk density causes a decrease in the output of extruded polyvinyl chloride resin.

SUMMARY OF THE INVENTION

It is an object of this invention to provide a process for suspension polymerizing vinyl chloride which overcomes or ameliorates the foregoing disadvantages.

Upon further study of the specification and appended claims, further objects and advantages of this invention will become apparent to those skilled in the art.

These objects have been attained by providing a process for the production of polymers and copolymers of vinyl chloride by suspension polymerization using a suspension stabilizer in the presence of monomer-soluble, free radical catalysts and, optionally, pH buffer systems, wherein the suspension stabilizer is 0.1–0.5% by weight, based on the amount of monomer, of a copolymer of 65–85 molar percent of 2-isopropyl-$\Delta^2$-oxazoline and 35–15 molar percent of 2-methyl-$\Delta^2$-oxazoline, having a viscosity number of 35–80 ml/g, measured at 25° C. in an isopropanol/water mixture (50 volume percent of isopropanol) in a concentration of 0.5% (weight/volume of solution).

DETAILED DISCUSSION

Herein, the term "suspension stabilizer" in all cases denotes a primary suspension stabilizer which is employed with or without a cosuspension stabilizer.

The 2-isopropyl-$\Delta^2$-oxazoline copolymers to be utilized in this invention have a viscosity number of 35–80 ml/g, preferably 45–70 ml/g, measured at 25° C. in an isopropanol/water mixture (50 vol-% isopropanol) in a concentration of 0.5% (weight/volume of solution). They can be prepared according to German Pat. No. 1,263,300, Chem. Reviews 71 (1971) 496, or U.S. application Ser. No. 301,269, filed on Sept. 11, 1981 now U.S. Pat. No. 4,365,056, all of whose disclosures are incorporated by reference herein, or in accordance with the method described in Example 1(a).

Suitable cosuspension stabilizers include the conventional water-soluble, high molecular weight compounds with a polymerization degree, for example between 50 and 3000. These include partially saponified polyvinyl acetates or cellulose derivatives. The partially saponified polyvinyl acetates or polyvinyl alcohols usually have a degree of saponification of up to 90 mole %. Suitable cellulose derivatives include methyl-, methylhydroxyethyl-, methylhydroxypropyl-, hydroxypropyl-, hydroxyethylcelluloses, and also various combinations of the aforementioned cosuspension stabilizers.

The high-molecular weight cosuspension stabilizers are ordinarily employed in concentrations of 0.005 to 0.02% by weight, based on the amount of monomer to be polymerized. Methyl-, methylhydroxypropyl-, methylhydroxyethyl- or hydroxyethyl- or hydroxypropyl- celluloses with a viscosity of 12–120 mPa·s, measured in a 2% by weight aqueous solution at 20° C., and partially saponified polyvinyl acetates with a degree of hydrolysis of 65–90 mol % and a viscosity of 2–50 mPa·s, measured in a 4% by weight aqueous solution at 20° C., are preferably used in amounts of 0.005 to 0.02% by weight, based on the amount of monomer.

Other suitable cosuspension stabilizers include oil-soluble, high-molecular weight materials.

These include, for example, partially saponified polyvinyl acetates with a degree of hydrolysis of 20 to 65 mole % and a number average polymerization degree of 200–3000. They are ordinarily utilized in concentrations of up to 0.5% by weight, based on the amount of monomer. It is also possible to use low-molecular weight emulsifiers having HLB [hydrophilic/lipophilic balance] values of 2 to 20, alone or in combination with these oil-soluble polyvinyl acetates. Such emulsifiers are usually employed in concentrations of up to 1% by weight, based on the amount of monomer. Typical molecular weights are for example 350.

Examples of suitable nonionic emulsifiers having an HLB value of 2 to 20 include sorbitan monolaurate, sorbitan monostearate, sorbitan monopalmitate, polyoxyethylene sorbitan monostearate, polyoxyethylene sorbitan monolaurate, etc.

The quantity of oxazoline copolymers to be added in accordance with this invention depends on the type and amount of cosuspension stabilizers optionally included and varies in a range from 0.1 to 0.5% by weight, preferably 0.1 to 0.3% by weight, based on the weight of the monomer to be polymerized. Precise amounts can be determined in accordance with fully conventional considerations, possibly in conjunction with routine preliminary experiments. In general, unless indicated otherwise herein, all details of the process of this invention are determined conventionally, e.g., as discussed in Helmut Kainer, Polyvinylchlorid und Vinylchlorid-Mischpolymerisate, Springer-Verlag, Berlin/Heidelberg/New York, (1965), S. 12–34, whose disclosure is incorporated by reference herein.

The conventional monomer-soluble free radical catalysts can be employed in this invention. Particularly noteworthy ones include diacyl peroxides, e.g. 2,4-dichlorobenzoyl peroxide, dibenzoyl peroxide, dilauryl peroxide, etc., peroxydicarbonates, such as, for example, diisopropyl, di-2-ethylhexyl, dicyclohexyl, dicetyl peroxydicarbonate, etc.; alkyl peresters, e.g. tert-butyl perpivalate, tert-butyl perbenzoate, etc.; azo compounds, e.g. azobisisobutyronitrile, etc.; mixed anhydrides of organic sulfoperacids and carboxylic acids, e.g. acetylcyclohexylsulfonyl peroxide, etc. The catalysts can be employed individually or in admixture with one another ordinarily in amounts of 0.01–0.3% by weight, preferably 0.01–0.15% by weight, based on the amount of monomer.

The polymerization can be conducted at customary temperatures of 30° to 75° C., preferably 40–70° C.

The use of up to 20% by weight of comonomers, e.g., 1–20%, is also possible in order to produce copolymers as is fully conventional. Examples of suitable comonomers which can be employed include vinyl esters, such as vinyl acetate, vinylidene halogenides, such as vinylidene chloride, acrylic acid and methacrylic acid alkyl esters of 1–18 carbon atoms in the alkyl moiety, such as the methyl, n-butyl, and lauryl esters, and monoolefins, such as ethylene or propylene.

The process can be conducted in the presence of conventional pH buffer systems, e.g., to achieve pH's of 2–10. Such systems include alkali acetates, borax alkali carbonates, ammonia, salts of ammonia alkali phosphates etc.

The oxazoline stabilizers of this invention are preferably predominantly linear copolymers, i.e., are only slighty branched. Such copolymers are especially readily preparable using the process of U.S. application Ser. No. 301,269 of Sept. 11, 1981. According to this application the 2-isopropyl-$\Delta^2$-oxazolines are primary suspension stabilizers, applicated soley or together with costabilizers as water soluble partially saponified polyvinyl acetates or cellulose derivatives. These costabilizers are used in such low amounts (0.005 up to 0.02 percent by weight; see page 4 lines 2 to 10 and claims 3 and 4), that they cannot be effective as primary suspension stabilizers. According to the U.S. application Ser. No. 301,270 the 2-isopropyl-$\Delta^2$-oxazolines are used only as cosuspension stabilizers, that means a primary suspension stabilizer as water soluble saponified polyvinyl acetates or celulose derivatives must be present. That means the water soluble saponified polyvinyl acetates or cellulose derivatives must be present in higher amounts than 0.02 percent by weight, otherwise they cannot be effective as primary suspension stabilizers.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever. In the following examples, all temperatures are set forth uncorrected in degrees Celsius; unless otherwise indicated, all parts and percentages are by weight.

EXAMPLE 1(a)

Production of the Polyoxazoline Copolymer

In a glass autoclave equipped with a helical ribbon impeller and a heating jacket, the following products where added at room temperature and under a nitrogen stream:

500 ml 2-isopropyl-$\Delta^2$-oxazoline
100 ml 2-methyl-$\Delta^2$-oxazoline
200 ml p-xylene Under agitation, 25.5 ml of a 0.1-molar solution of methyl p-toluenesulfonate in p-xylene was subsequently introduced. The pressure was adjusted to a total pressure of 1.5 bar and the thermostat connected to the heating jacket was set to 150° C. Within a heating-up time of 10 minutes, the internal temperature of the reaction reached 150° C.

After pressure equalization, 700 ml of isopropyl alcohol was charged. Subsequently, the homogeneous, highly viscous solution was forced at 85° C. and a total pressure of 1.5 bar into a processing apparatus charged with 3 liters of hexane. After one-half hours of agitation, another liter of hexane was added. The product phase was separated from the solvent phase, flushed with methylene chloride, and dried at 60° C. for 12 hours. The resultant product was utilized as the suspension stabilizer for the suspension polymerization of vinyl chloride according to Examples 1(b) and 1(c). The viscosity number of the product was 52 (ml/g), measured at 25° C. in an isopropanol/water mixture (50 vol-% isopropanol) in a concentration of 0.5% (weight/volume of solution). The copolymer contained 78 mole % of 2-isopropanol-$\Delta^2$-oxazoline and 22 mole % of 2-methyl-$\Delta^2$-oxazoline.

EXAMPLE 1(b)

A 40-liter stainless steel polymerization autoclave was charged with the following components: 20,000 parts of water, 20 parts of the polyoxazoline copolymer produced according to Example 1(a), 9.30 parts of dicetyl peroxydicarbonate, 11 parts of dilauroyl peroxide, and 4 parts of ammonium bicarbonate. The autoclave was sealed, flushed with nitrogen, evacuated, and then charged with 10,000 parts of vinyl chloride. The polymerization was carried out for 6 hours at a temperature of 54° C. and up to a pressure of 5 bar. The products where separated from the largest portion of the suspension water and dried at 50° C. in a fluidized-bed dryer.

As can be seen from Table I, a polyvinyl chloride resin is obtained having a very high porosity with a relatively high apparent density, a low gel content with dioctyl phthalate as well as with highly a viscous polymer plasticizer, and having high specific volume resistivity values.

COMPARATIVE TEST A

The procedure of Example 1(b) was carried out, but using, instead of the polyoxazoline copolymer employed in accordance with this invention, the same quantity of a partially saponified polyvinyl acetate having a degree of hydrolysis of about 74 mole % and a viscosity of about 2.8 mPa·s (measured in a 4% by weight aqueous solution at 20° C.) as the suspension stabilizer.

As can be seen from Table I, the thus-produced polyvinyl chloride resin exhibits a very high gel content and a relatively low porosity.

COMPARATIVE TEST B

The procedure of Example 1(b) was followed, but using as the suspension stabilizer, instead of the polyoxazoline copolymer employed according to this invention, the same amount of a partially saponified polyvinyl acetate having a degree of hydrolysis of 69–73 mole % and a viscosity of 3.5–5.5 mPa·s (measured in a 4% by weight aqueous solution at 20° C).

As can be derived from Table I, this product also exhibits a very high gel content and a low porosity.

COMPARATIVE TEST C

The procedure was conducted as described in Exampe 1(b), but utilizing, instead of the polyoxazoline copolymer according to this invention, 10 parts by weight of a hydroxypropylmethylcellulose with a methoxy substitution degree of 1.86–1.90, a propylene glycol ether substitution of 0.22–0.25, and a viscosity of about 15 mPa·s (measured in a 2% aqueous solution at 20° C.).

As can be seen from Table I, the thus-prepared polyvinyl chloride has a very high gel content and a low porosity.

EXAMPLE 1(c)

The process was conducted as described in Example 1(b), but using as the cosuspension stabilizer, in addition to the polyoxazoline copolymer employed according to this invention, 20 parts of a 25% weight methanolic solution of a polyvinyl alcohol having a saponification number of 437 and a viscosity number of 14 ( ml/g), measured in a 0.5% solution in a methanol/water mixture (50 vol-%) at 20° C.

As can be seen from Table I, the thus-produced polyvinyl chloride exhibits a very high porosity with a relatively high bulk density, a high plasticizer absorption rate, and a very low gel content.

COMPARATIVE TEST D (According to DOS No. 2,629,880)

The procedure was carried out as set forth in Example 1(c), but using as the suspension stabilizer, instead of the polyoxazoline copolymer employed according to this invention, 20 parts of a polyvinyl alcohol with a degree of hydrolysis of 72.5–75.5 mole % having a viscosity of 4–6 mPa·s, measured in a 5% aqueous solution at 20° C.

As can be derived from Table I, the thus-prepared polyvinyl chloride resin has a very high gel content.

COMPARATIVE TEST E (According to DOS No. 2,528,950)

The procedure of Example 1(c) was followed, but using as the suspension stabilizer, instead of the polyoxazoline copolymer utilized according to this invention, 12 parts of the hydroxypropylmethylcellulose employed in Comparative Test C.

As can be seen from Table I, the thus-produced polyvinyl chloride resin still has an unsatisfactorily high gel content and an undesirably low porosity.

TABLE I

| | Particle Size Distribution Screening Residue in % by Weight with Following Mesh Sizes | | | | | Bulk Density[1] (g/l) | Plasticizer Absorption[3] [ g DOP / 100 g PVC ] [2] | Evaluation of Fisheyes DOP as Plasticizer[4] Screw Revolutions | |
|---|---|---|---|---|---|---|---|---|---|
| | 63 μm | 100 μm | 160 μm | 200 μm | 250 μm | | | 40 rpm | 80 rpm |
| Example 1b | 98 | 93 | 50 | 22 | 2.8 | 460 | 40.0 | 2 | 2–3 |
| Comp. Test A | 100 | 88 | 68 | 32 | 6.4 | 508 | 28.8 | >5 | >5 |
| Comp. Test B | 99 | 93 | 39 | 1.7 | 1.2 | 486 | 25.0 | 5 | >5 |
| Comp. Test C | 94 | 72 | 5.2 | 0.2 | | 505 | 25.7 | >5 | >5 |
| Example 1c | 100 | 89 | 11 | 1.5 | 0.8 | 452 | 40.2 | 1 | 2–3 |
| Comp. Test D | 95 | 58 | 0.3 | | | 444 | 32.0 | 4.5 | 5 |
| Comp. Test E | 97 | 74 | 5.0 | 1.4 | | 462 | 30.3 | 3–4 | >5 |

| | Bulk Density Soft Mixture[8] (g/l) | Output[5] (g/min) | | Evaluation of Fisheyes with Polymer Plasticizer[6] | | | Secific Volume Resistivity[7] (Ω · cm) at | |
|---|---|---|---|---|---|---|---|---|
| | | 40 rpm | 80 rpm | 20 rpm | 40 rpm | 80 rpm | 23° C. | 70° C. |
| Example 1b | 480 | 35.3 | 70.1 | 3 | 3.5 | 4.0 | $147 \cdot 10^{13}$ | $12.3 \cdot 10^{11}$ |
| Comp. Test A | 493 | 31.5 | 70.8 | 6 | 6 | >6 | $103 \cdot 10^{13}$ | $6.4 \cdot 10^{11}$ |
| Comp. Test B | 461 | 43.3 | 71.5 | >6 | >6 | >6 | $99 \cdot 10^{13}$ | $4.5 \cdot 10^{11}$ |
| Comp. Test C | 485 | 45.7 | 77.3 | >6 | >6 | >6 | $120 \cdot 10^{13}$ | $6 \cdot 10^{11}$ |
| Example 1c | — | 40.8 | 71.0 | 3 | 3.5 | 4.0 | $115 \cdot 10^{13}$ | $10.5 \cdot 10^{11}$ |
| Comp. Test D | 437 | 42 | 69.4 | >6 | >6 | >6 | $73 \cdot 10^{13}$ | $4.5 \cdot 10^{11}$ |
| Comp. Test E | 463 | 41.4 | 74.3 | >6 | >6 | >6 | $90 \cdot 10^{13}$ | $3.9 \cdot 10^{11}$ |

[1]According to DIN [German Industrial Standard] 53 468.
[2]DOP = di(2-ethylhexyl)phthalate.
[3]According to DIN 53 417/1 (centrifuging method - a measure for granular porosity).
[4]Testing method with DOP as the plasticizer. Comparison with standard samples, 5 denoting an extremely high number, 3–4 an average number, and 1 an extremely low number of fisheyes or gels. The numbers in between are corresponding

TABLE I-continued intermediate stages. The indicated values are averages from several evaluations made on blow-molded films extruded at the two screw speeds indicated. Testing recipe: 100 parts PVC, 42.9 parts DOP, 4.76 parts "Nuostab V 1204", and 0.76 part "LOXIOL G 40".

[5] Output of the mixtures extruded in accordance with item (4).

[6] Testing method with a high-viscosity, polymeric adipic acid ester as the plasticizer. Comparison with standard samples, wherein 6 means an extremely high number, 3.5 a medium number, and 1 an extremely low number of fisheyes or gels. The numbers therebetween are corresponding intermediate stages. The indicated values are averages from several evaluations of blown films extruded at the three indicated screw speeds. Testing recipe: 70 parts PVC, 30 parts "WITAMOL 621", 4 parts "Nuostab V 1204", 0.2 part "Loxiol G 40".

[7] According to DIN 53 482.

[8] Apparent density of the soft mixture produced with the recipe set forth in item (4), As can be clearly seen from Table I, the process of this invention surprisingly results in a markedly lower number of fisheyes and in an appreciably raised plasticizer absorption, as compared with the relevant state of the art. Since the plasticizer absorption is an indication of the porosity of the polymer, it is simultaneously ensured that the residual monomer can be surprisingly easily removed. Furthermore, also the ratio of plasticizer absorption:bulk density is, according to this invention, clearly more favorable than in case of the closest state of the art.

The preceding examples can be repeated with similar success by substituting the generically or specifically described reactants and/or operating conditions of this invention for those used in the preceding examples. From the foregoing description, one skilled in the art can easily ascertain the essential characteristics of this invention, and without departing from the spirit and scope thereof, can make various changes and modifications of the invention to adapt it to various usages and conditions.

What is claimed is:

1. In a process for preparing a polymer or copolymer of vinyl chloride by suspension polymerization using a suspension stabilizer and a monomer-soluble free radical catalyst, the improvement wherein the suspension stabilizer is 0.1–0.5% by weight, based on the amount of monomer, of a copolymer of 65–85 molar percent of 2-isopropyl-$\Delta^2$-oxazoline and 35–15 molar percent of 2-methyl-$\Delta^2$-oxazoline, having a viscosity number of 35–80 ml/g, measured at 25° C. in an isopropanol/water mixture (50 volume percent of isopropanol) in a concentration of 0.5% (weight/volume of solution).

2. A process of claim 1, wherein the suspension stabilizer also comprises a cosuspension stabilizer which is 0.005–0.50% by weight, based on the amount of monomer, of a partially saponified polyvinyl acetate with a degree of hydrolysis of 20 to 65 molar percent and a polymerization degree (number average) of 200–3,000.

3. A process of claim 1, wherein the suspension stabilizer also comprises a cosuspension stabilizer which is 0.005 to 0.02% by weight, based on the amount of monomer, of methyl-, methylhydroxypropyl-, methylhydroxyethyl-, or hydroxyethyl- or hydroxypropylcellulose with a viscosity of 12–120 mPa·s, measured in a 2% by weight aqueous solution at 20° C.

4. A process of claim 1, wherein the suspension stabilizer further comprises a cosuspension stabilizer which is 0.005 and 0.02% by weight, based on the amount of monomer, of a partially saponified polyvinyl acetate with a degree of hydrolysis of 65–90 molar percent and a viscosity of 2–50 mPa·s, measured in a 4% by weight aqueous solution at 20° C.

5. A process of claim 1, wherein the polymerization is conducted in the presence of 0.01–1% based on the amount of monomer of a nonionic emulsifier having an HLB value of 2 to 20.

6. A process of claim 1, wherein the viscosity number of the $\Delta^2$-oxazoline suspension stabilizer copolymer is 45–70 ml/g as defined in claim 1.

7. A process of claim 1 or 5, wherein the amount of $\Delta^2$-oxazoline suspension stabilizer copolymer is 0.1 to 0.3 wt. % based on the amount of monomer.

8. A process of claim 1, wherein the polymerization is conducted in the presence of a pH buffer.

9. A process of claim 1, wherein the vinyl chloride polymer produced is a homopolymer.

10. A process of claim 1, wherein the vinyl chloride polymer is a copolymer produced from vinyl chloride monomer and up to 20% of a comonomer.

11. A process of claim 1, wherein the $\Delta^2$-oxazoline copolymer is the sole suspension stabilizer.

* * * * *